(12) United States Patent
Tseng

(10) Patent No.: US 8,912,457 B2
(45) Date of Patent: Dec. 16, 2014

(54) CONTROLLING DEVICE OF TURNING KNOB AND CONTROLLING METHOD OF TOUCH PANEL

(71) Applicant: Wistron Corporation, New Taipei (TW)

(72) Inventor: Tien-Chung Tseng, New Taipei (TW)

(73) Assignee: Wistron Corporation, New Taipei (TW)

( * ) Notice: Subject to any disclaimer, the term of this patent is extended or adjusted under 35 U.S.C. 154(b) by 301 days.

(21) Appl. No.: 13/649,127

(22) Filed: Oct. 11, 2012

(65) Prior Publication Data

US 2014/0042004 A1 Feb. 13, 2014

(30) Foreign Application Priority Data

Aug. 13, 2012 (TW) .............................. 101129225 A (51) Int. Cl.
  *H01H 3/08* (2006.01)
  *H01H 3/14* (2006.01)
  *G05G 1/10* (2006.01)
  *G06F 3/0488* (2013.01)
  *G06F 3/0362* (2013.01)
  *G06F 3/0484* (2013.01)

(52) U.S. Cl.
  CPC ................ *G05G 1/10* (2013.01); *G06F 3/0488* (2013.01); *G06F 3/0362* (2013.01); *G06F 3/04847* (2013.01)
  USPC ......................................... 200/336; 200/329

(58) Field of Classification Search
  CPC ............. H01H 3/08; H01H 3/12; H01H 3/14; G05G 1/00; G05G 1/10; G06G 1/00
  USPC .......................... 200/329, 336, 292, 570, 571
  See application file for complete search history.

(56) References Cited

U.S. PATENT DOCUMENTS

| 6,067,424 A * | 5/2000 | Shono ........................... 200/336 |
| 7,091,437 B2 * | 8/2006 | Yeh et al. ...................... 200/571 |
| 7,414,205 B1 * | 8/2008 | Heinrich et al. .................. 200/4 |
| 7,990,731 B2 * | 8/2011 | Guo et al. ..................... 200/341 |

* cited by examiner

*Primary Examiner* — Amy Cohen Johnson
*Assistant Examiner* — Marina Fishman
(74) *Attorney, Agent, or Firm* — Jianq Chyun IP Office (57) ABSTRACT

A controlling device of turning knob is disposed on a touch panel removably so as to control the touch panel. The controlling device of turning knob includes a base and a turning knob. The base has a bottom side, a top side, a plurality of first pads disposed at the bottom side, and at least two second pads disposed at the top side. The second pads are electrically connected to parts of the first pads. The base is assembled to the touch panel with its bottom side, such that the first pads touch the touch panel. The turning knob disposed on the top side rotates about a rotating axis. The turning knob has a plurality of third pads surrounding the rotating axis. When the turning knob rotates along a direction relative to the base, the third pads are electrically connected to the corresponding second pads sequentially.

22 Claims, 12 Drawing Sheets

CONTROLLING DEVICE OF TURNING KNOB AND CONTROLLING METHOD OF TOUCH PANEL

CROSS-REFERENCE TO RELATED APPLICATION

This application claims the priority benefit of Taiwan application serial no. 101129225, filed on Aug. 13, 2012. The entirety of the above-mentioned patent application is hereby incorporated by reference herein and made a part of this specification.

BACKGROUND

1. Technical Field

The disclosure relates generally to a turning knob control device, and more particularly to a turning knob control device for controlling a touch panel.

2. Related Art

The integration of the touch panel or the touch pad has become the trend because the user interface on portable information technology (IT) products can be more user friendly. Panel manufacturers and integrated circuit (IC) design companies have made touch panel technologies their main research topic, and related techniques and products have been applied in electronic products of everyday life, as in IT products such as mobile phones, computers, and personal digital assistants (PDAs).

The touch devices commonly adopted nowadays are mainly categorized as resistive and capacitive, in which the main operating principle of the capacitive touch devices relies on sensing the electrical characteristics of a capacitance. When two layers of electrically conductive objects approach each other but do not touch, the electric fields act to generate a capacitance. The upper and lower layers in a touch panel structure are conductive layers respectively formed by electrical traces arranged in interlaced directions. A finger is also an electrically conductive object. When the finger is placed on the touch panel, a extremely small capacitance is formed between the electrical traces of the touch panel and the finger. A microprocessor can detect the touch position of the user by using the capacitance variation.

SUMMARY

The disclosure provides a turning knob control device and a controlling method of a touch panel, in which the user can control the touch panel using a physical object.

An embodiment of the disclosure provides a turning knob control device, disposed on a touch panel removably to control the touch panel. The turning knob control device includes a base and a turning knob. The base has a bottom side, a top side, a plurality of first pads, and a plurality of second pads. The first pads are disposed at the bottom side, the second pads are disposed at the top side, and the second pads are electrically connected to corresponding parts of the first pads. The base is assembled to the touch panel with the bottom side, such that the first pads touch the touch panel. The turning knob is disposed on the top side of the base rotating about a rotating axis. The turning knob has a plurality of third pads facing the base and surrounding the rotating axis. When the turning knob rotates along a direction relative to the base, the third pads are electrically connected to the corresponding at least one of the second pads sequentially.

An embodiment of the disclosure provides a controlling method of a turning knob control device, including disposing the afore-described turning knob control device on the touch panel, such that the first pads are attached on the touch panel. A control unit of the touch panel detects the first pads and turns on a control mode. When the turning knob rotates relative to the base, the turning knob controls a response property of the touch panel under the control mode.

According to an embodiment of the disclosure, the third pads are arranged as at least two concentric circles relative to the rotating axis. An orthographic projection of the second pads on the turning knob is disposed on the concentric circles.

According to an embodiment of the disclosure, the third pads located on different concentric circles are disposed alternating on the radial direction relative to the rotating axis of the turning knob.

According to an embodiment of the disclosure, the second pads corresponding to different concentric circles are disposed alternating on the radial direction relative to the rotating axis of the turning knob.

According to an embodiment of the disclosure, the turning knob control device further includes a first button movably disposed at the top side of the base. The first button has a fourth pad facing the top side, and the base has a fifth pad disposed at the top side and corresponding to the fourth pad. The fifth pad is electrically connected to one of the first pads. The first button is adapted to receive an external press so the fourth pad touches the fifth pad, and the fifth pad and the fourth pad are electrically connected to the corresponding one of the first pads.

According to an embodiment of the disclosure, the turning knob has a through hole. The first button is disposed in the through hole, such that the turning knob and the first button are disposed in a same axis relative to the base.

According to an embodiment of the disclosure, the base has a center portion and a disc portion surrounding the center portion, and the first button and the turning knob are disposed at the center portion.

According to an embodiment of the disclosure, the turning knob control device further includes at least one second button disposed at the disc portion of the base. The second button has a sixth pad, and the base has at least one seventh pad disposed at the disc portion and corresponding to the sixth pad. The seventh pad is electrically connected to at least one of the first pads. The second button is adapted to receive an external press so the sixth pad touches the seventh pad, and the sixth pad and the seventh pad are electrically connected to the corresponding one of the first pads.

According to an embodiment of the disclosure, the base has a window disposed at the disc portion. The window exposes a portion of the touch panel when the base is assembled to the touch panel.

According to an embodiment of the disclosure, the turning knob includes a first rotating element, a second rotating element, and a third rotating element disposed in a same axis relative to the rotating axis. The first rotating element and the second rotating element are assembled to the top side on a same plane. The second rotating element surrounds the first rotating element, and the first and second rotating elements are independent from each other. The third rotating element is disposed on the first rotating element and the second rotating element. The third pads are respectively disposed on the first rotating element and the second rotating element.

According to an embodiment of the disclosure, the first rotating element and the second rotating element are respectively a ratchet wheel. The first rotating element and the second rotating element respectively has a plurality of first ratchets and a plurality of second ratchets disposed at a top portion. Moreover, the first ratchets incline toward a second rotating direction relative to the rotating axis, and the second ratchets incline toward a first rotating direction relative to the rotating axis. The first rotating direction is opposite to the second rotating direction. The third rotating element has at least one first drive gear and at least one second drive gear disposed at a bottom portion. When the third rotating element rotates along the first rotating direction, the first drive gear engages with one of the first ratchets, and the second drive gear slides past the second ratchets, such that the third rotating element only drives the first rotating element to rotate. When the third rotating element rotates along the second rotating direction, the first drive gear slides past the first ratchets, and the second drive gear engages with one of the second ratchets, such that the third rotating element only drives the second rotating element to rotate.

According to an embodiment of the disclosure, the base has an inner ratchet structure and an outer ratchet structure disposed at the top side. The ratchets of the inner ratchet structure match the first ratchets. The ratchets of the outer ratchet structure match the second ratchets. The first rotating element and the second rotating element are disposed between the inner ratchet structure and the outer ratchet structure, in which the first rotating element is coupled to the inner ratchet structure, and the second rotating element is coupled to the outer ratchet structure.

According to an embodiment of the disclosure, the first rotating element and the second rotating element are respectively a ring structure. The first rotating element has a first fastening elastic arm disposed at an inner wall. The second rotating element has a second fastening elastic arm disposed at an outer wall. The first fastening elastic arm follows the direction of the inner ratchet structure and slidably fastens between any two adjacent ratchets of the inner ratchet structure. The second fastening elastic arm follows the direction of the outer ratchet structure and slidably fastens between any two adjacent ratchets of the outer ratchet structure.

According to an embodiment of the disclosure, the base has four second pads. Each of the second pads has semicircular outlines. The four second pads are disposed in pairs on different concentric circles relative to the rotating axis.

According to an embodiment of the disclosure, in the two second pads forming a pair, one of the second pads is electrically connected to one of the first pads, and the other one of the second pads is electrically connected to the turning knob. When the third pad bridges the second pads, the turning knob, the second pads, and the third pad are electrically connected to the corresponding first pad.

According to an embodiment of the disclosure, the turning knob control device further includes an attaching element disposed at the bottom side of the base to attach the base to the touch panel.

According to an embodiment of the disclosure, the turning knob control device further includes a first button movably disposed at the top side of the base. The first button has a fourth pad facing the top side, and the base has a fifth pad disposed at the top side and corresponding to the fourth pad. The fifth pad is electrically connected to one of the first pads. The controlling method of the touch panel further includes pressing the first button so the fourth pad touches the fifth pad, the fifth pad and the fourth pad are electrically connected to the corresponding one of the first pads, and the control mode is turned on.

According to an embodiment of the disclosure, the third pads are arranged as at least two concentric circles relative to the rotating axis. An orthographic projection of the second pads on the turning knob is disposed on the concentric circles. The controlling method of the touch panel further includes, when the turning knob rotates relative to the base, having a time difference between the third pads disposed on a first concentric circle touching the corresponding second pad, and the third pads disposed on a second concentric circle touching the corresponding second pad.

According to an embodiment of the disclosure, when the turning knob rotates along a first rotating direction relative to the base, the third pads disposed on the first concentric circle touch the corresponding second pad before the third pads disposed on the second concentric circle. When the turning knob rotates along a second rotating direction relative to the base, the third pads disposed on the first concentric circle touch the corresponding second pad after the third pads disposed on the second concentric circle. The first rotating direction is opposite to the second rotating direction.

According to an embodiment of the disclosure, the turning knob control device further includes at least one second button disposed at the base. The second button has a sixth pad, and the base has at least one seventh pad corresponding to the sixth pad. The seventh pad is electrically connected to at least one of the third pads. The controlling method of the touch panel further includes pressing the second button to switch between a plurality of sub modes of the control mode.

According to an embodiment of the disclosure, the base has a window exposing a portion of the touch panel. The controlling method of the touch panel further includes, after the touch panel turns on the control mode, displaying the response property in the window.

In summary, according to embodiments of the disclosure, the user can indirectly control the touch panel by disposing the turning knob control device on the touch panel, and having the pads trigger the touch panel to enter the control mode. Accordingly, the user can use a physical object instead of the hand directly contacting the touch panel, such that the user can experience a preferable control sensation due to the physical object.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
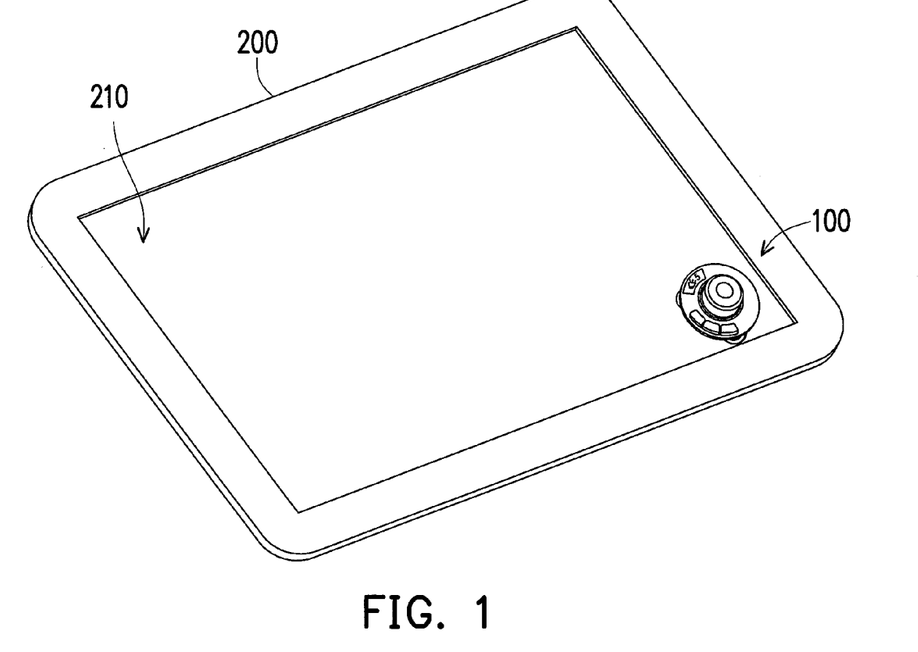
FIG. 1 is a schematic view of a turning knob control device applied on an electronic device according to an embodiment of the disclosure.
Figure 2:
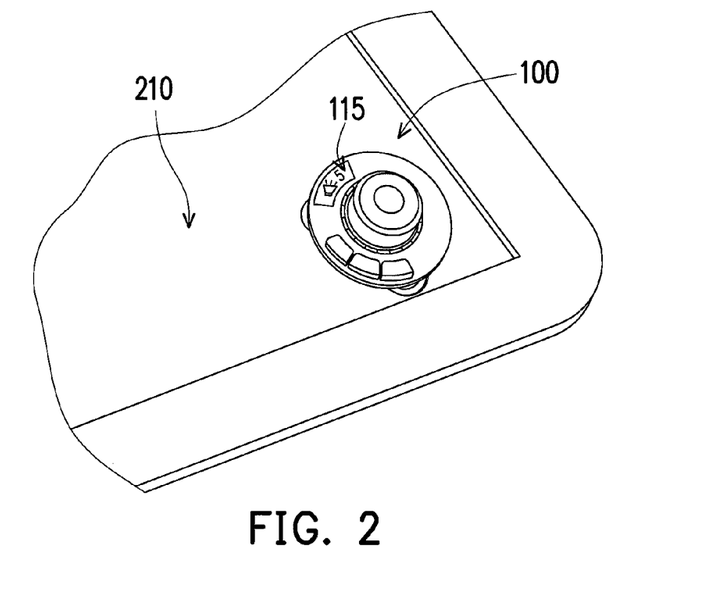
FIG. 2 is a partial enlarged view of the turning knob control device and the electronic device depicted in FIG. 1.

FIG. 1 is a schematic view of a turning knob control device applied on an electronic device according to an embodiment of the disclosure. FIG. 2 is a partial enlarged view of the turning knob control device and the electronic device depicted in FIG. 1. With reference to FIGS. 1 and 2, in the present embodiment, a turning knob control device 100 is disposed on a touch panel 210 of an electronic device 200 removably, so that a user can control the touch panel 210 by operating the turning knob control device 100. The present embodiment uses a tablet computer as an example for description, although the disclosure is not limited thereto. The turning knob control device 100 can be disposed on any electronic device having a touch panel to achieve the control effect. Moreover, the disclosure does not limit the region that the turning knob control device 100 is disposed on the touch panel 210. That is, the turning knob control device 100 may be placed on any region on the touch panel 210 that allows the user to touch control.

Figure 3:
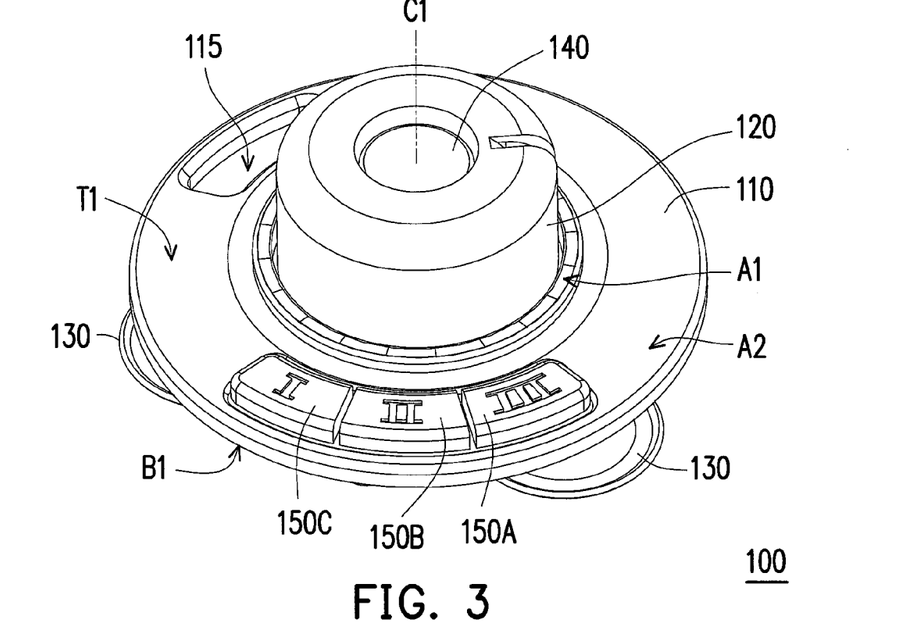
FIGS. 3 and 4 are schematic perspective views respectively showing the turning knob control device of FIG. 1 under different viewing angles.
Figure 4:
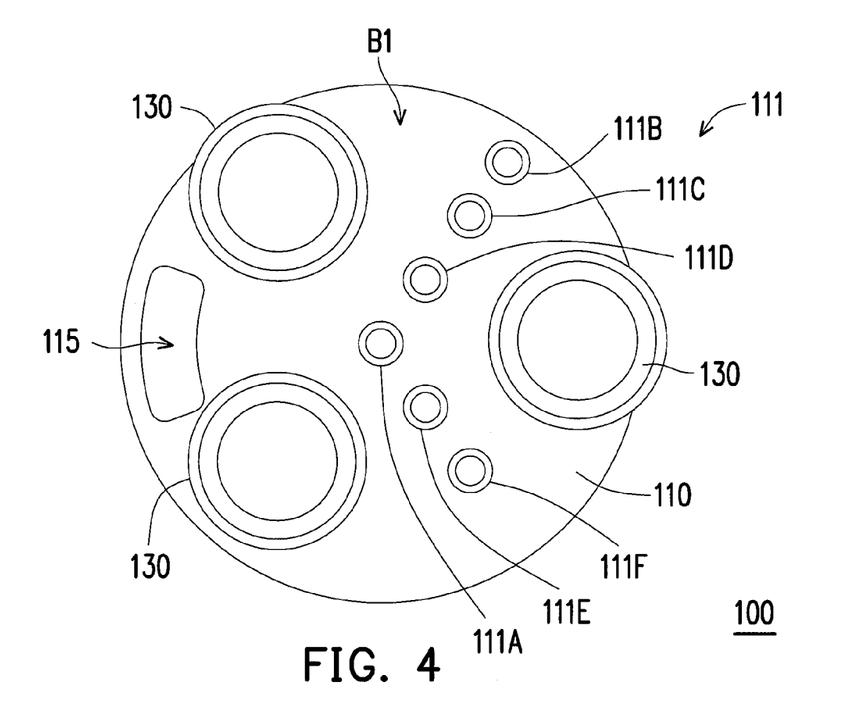
Figure 5:
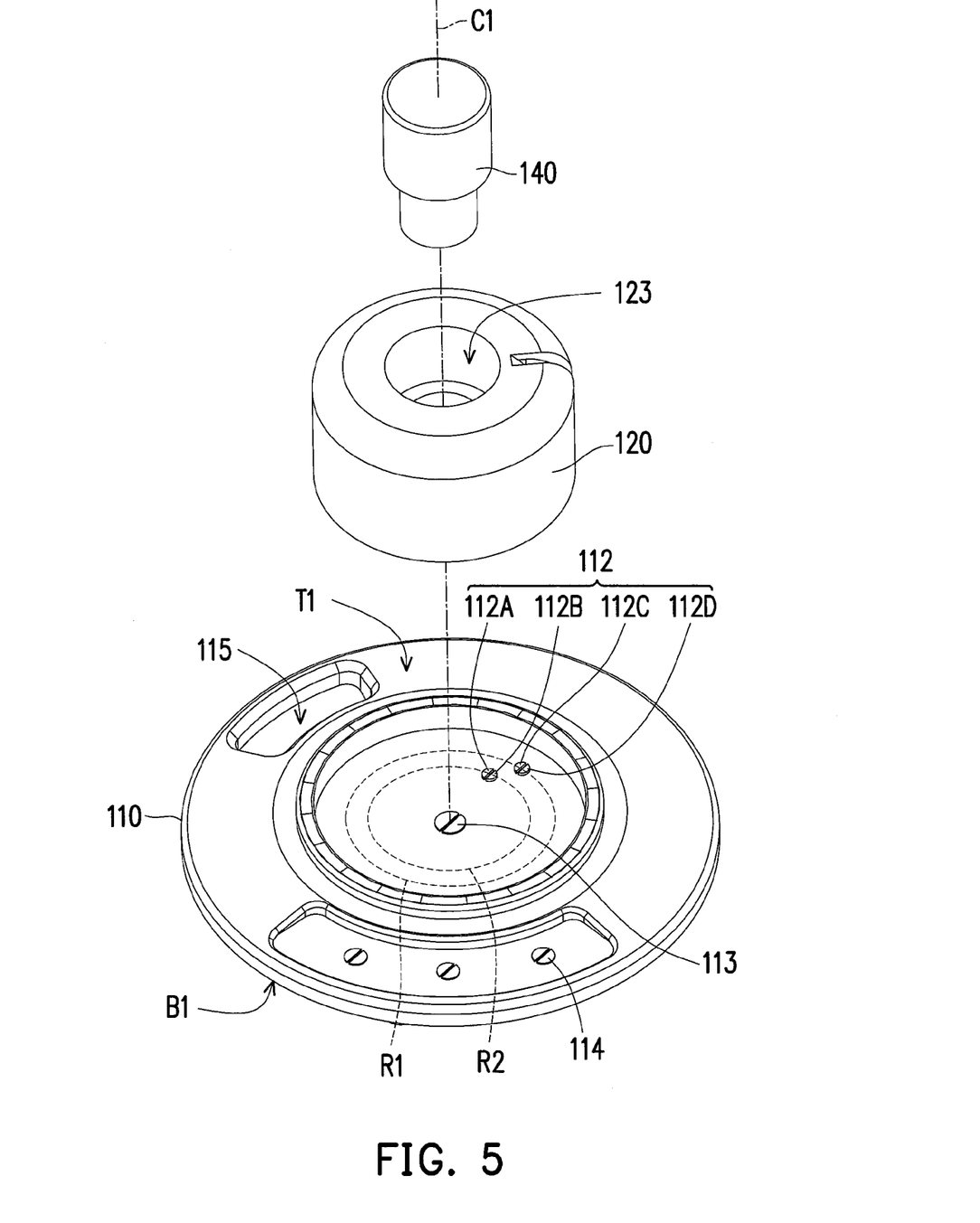
FIGS. 5 and 6 are exploded views respectively showing a turning knob control device under different viewing angles.
Figure 6:
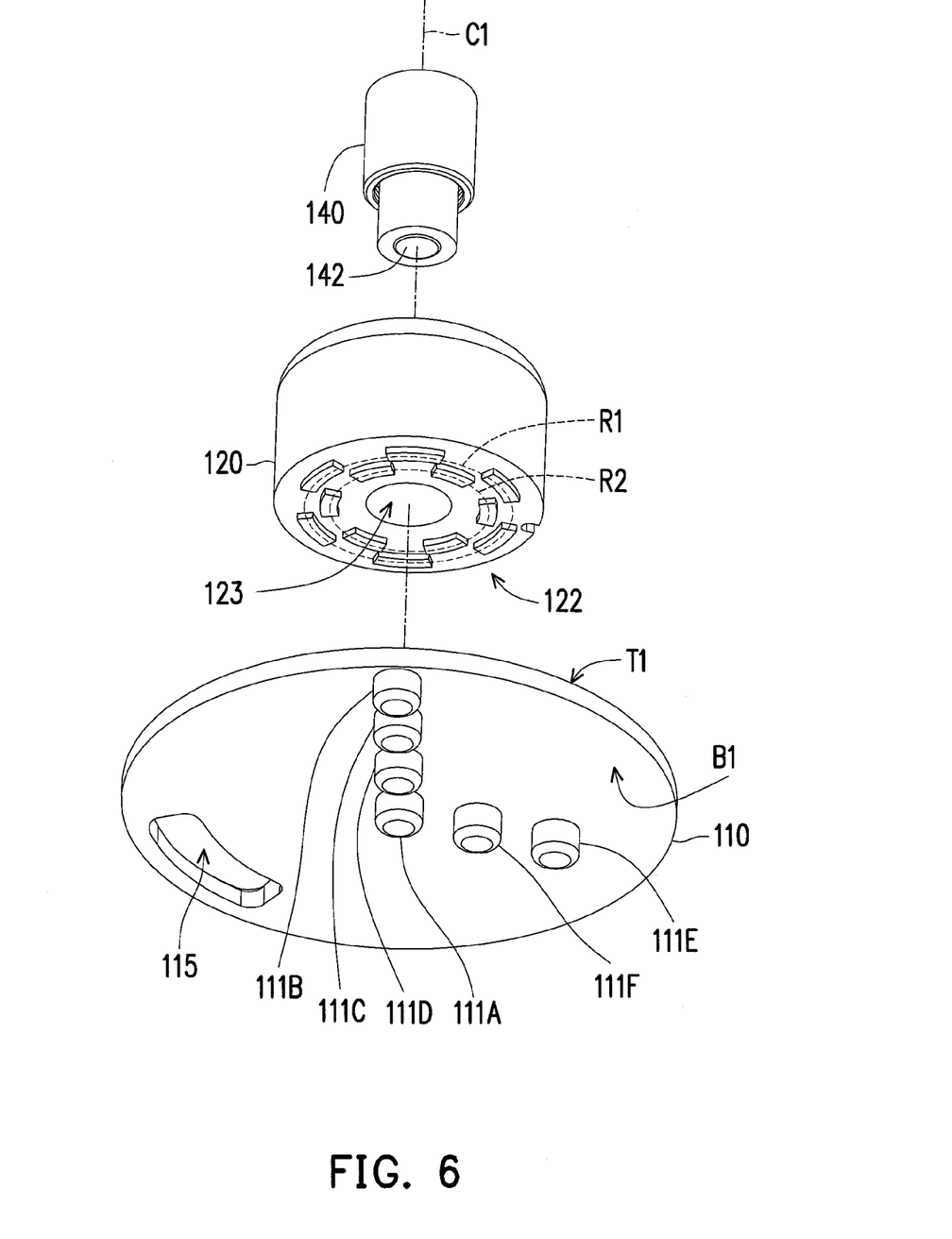

FIGS. 3 and 4 are schematic perspective views respectively showing the turning knob control device of FIG. 1 under different viewing angles. FIGS. 5 and 6 are exploded views respectively showing a turning knob control device under different viewing angles. Please refer to FIGS. 3-6. In the present embodiment, the turning knob control device 100 includes a base 110, a turning knob 120, and a plurality of attaching elements 130. The attaching elements 130 (e.g., three are drawn in the present embodiment, although the disclosure is not limited thereto) are suckers or any device that can attach the base 110 on the touch panel 210, and so the disclosure does not limit the attaching elements 130. The base 110 has a bottom side B1, a top side T1, a plurality of first pads 111, and a plurality of second pads 112. The first pads 111 are disposed at the bottom side B1 of the base 110, the second pads are disposed at the top side T1 of the base 110, and the second pads 112 are respectively electrically connected to the corresponding first pads 111. As shown in FIGS. 1 and 2, in the turning knob control device 100, the base 110 is assembled to the touch panel 210 of the electronic device 200 with the bottom side B1, such that the first pads 111 touch the touch panel 210.

Moreover, the turning knob 120 is disposed on the top side T1 of the base 110 rotating about a rotating axis C1. The turning knob 120 has a plurality of third pads 122 facing the base 110 and surrounding the rotating axis C1. When the turning knob 120 rotates along a direction about the rotating axis C1 of the base 110, the third pads are electrically connected to the second pads 112 disposed on the base 110 sequentially. In addition, since the aforementioned first pads 111, second pads 112, and third pads 122 are all conductive, when the third pads 122 are electrically connected to the second pads 112 because of the user operating the turning knob 120, the first pads 111, the second pads 112, and the third pads 122 generate electrical connections with each other and form a conductive path. Accordingly, the user's hand touching the turning knob 120 conducts to the touch panel 210 through the conductive path, thereby achieving an effect of the user indirectly touch controlling the touch panel 210.

In the present embodiment, the third pads 122 located on different concentric circles are disposed alternating on the radial direction relative to the rotating axis C1 of the turning knob 120 (e.g., as shown in FIG. 5, relative to the rotating axis C1, the second pads 112A and 112B and the second pads 112C and 112D alternate on the radial direction). Similarly, the second pads 112 located on different concentric circles are disposed alternating on the radial direction relative to the rotating axis C1 of the turning knob 120.

In the present embodiment, the first pads 111 disposed at the bottom side B1 of the base 110 are arranged into a pattern. The electronic device 200 may detect a particular pattern and/or a pad quantity of the first pads through the touch panel 210. By recognizing the quantity and/or the particular pattern of the first pads, the electronic device 200 can accurately determine whether the turning knob control device 100 has touched the touch panel 210, and thereby determine whether to turn on a control mode. When the turning knob control device 100 has touched the touch panel 210, this represents that the user has operated the touch panel 210 using the particular motion. Accordingly, the control mode is turned on by the touch panel 210 of the electronic device 200, such that the touch panel 210 can be operated by the turning knob control device 100. For example, when the user wants to adjust an output volume or a brightness level of the screen of the electronic device 200, the turning knob control device 100 can be disposed on the touch panel 210 of the electronic device 200, such that the control mode of the touch panel 210 is turned on. Accordingly, with the user rotating the turning knob 120 and adjusting the response properties (e.g., the aforementioned volume or brightness level) of the electronic device 200, a physical controlling operation sensation of the electronic device 200 can be achieved by using the turning knob control device 100. However, the embodiment does not limit the arrangement of the first pads 111, which can be set according to a user need. In other words, the embodiment does not limit how the turning knob control device 100 triggers the touch panel 210 into entering the control mode.

With reference to FIGS. 5 and 6, structurally, the third pads 122 of the present embodiment are arranged as two concentric circles R1 and R2 relative to the rotating axis C1. With respect to the turning knob 120 depicted in FIG. 6, a part of the third pads 122 is disposed on a trajectory of the outer circle R1 and form a dashed circular pattern, and the remaining third pads 122 are disposed on a trajectory of the inner circle R2 and form another dashed circular pattern. After the turning knob 120 is disposed on the base 110, an orthographic projection of the second pads 112 on the turning knob 120 is disposed on the trajectories of the two concentric circles R1 and R2.

Figure 7A:
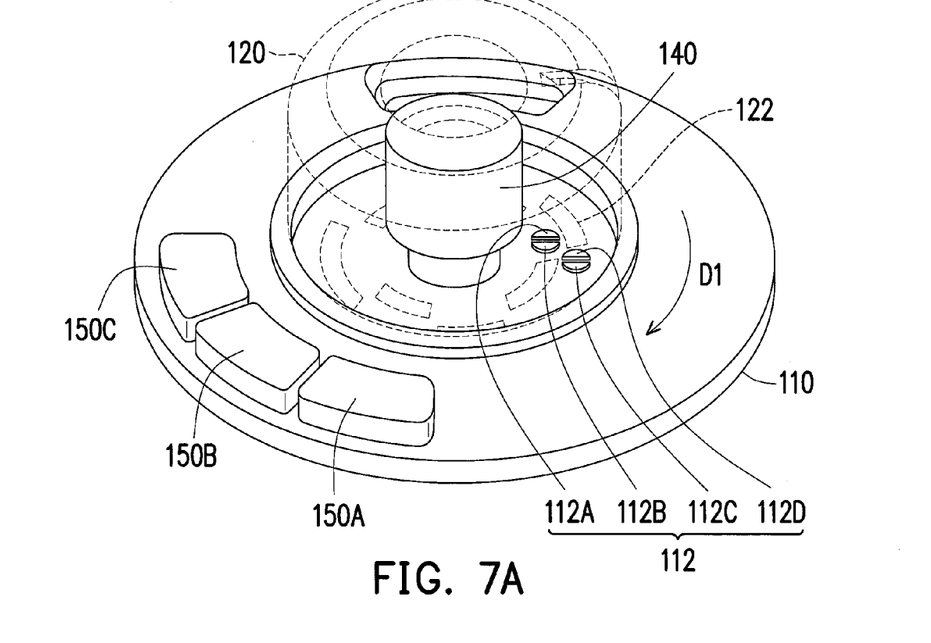
FIGS. 7A-7D illustrate the touch states of the third pads and the second pads at different times.
Figure 7B:
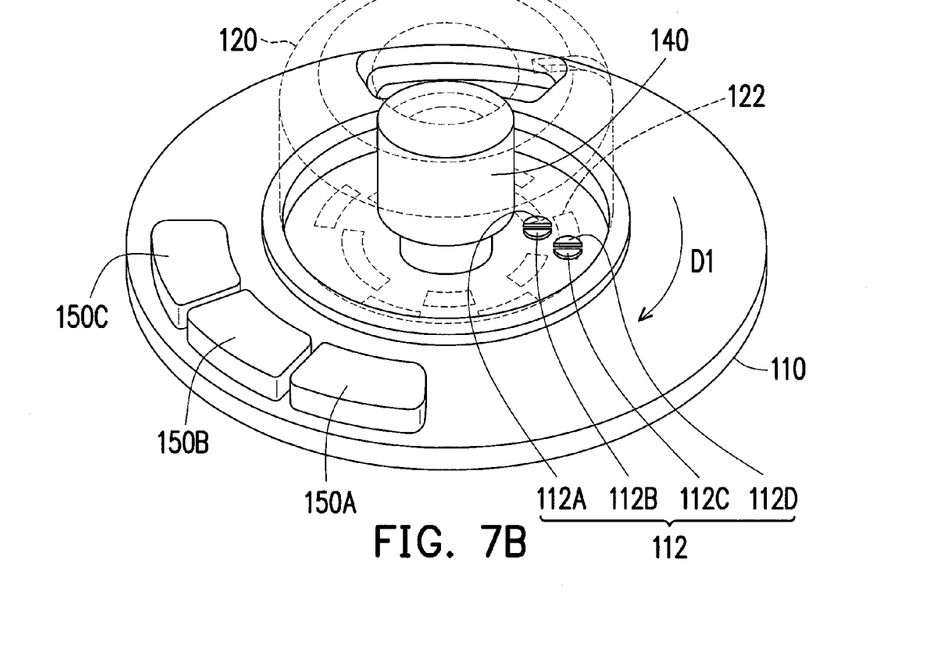
Figure 7C:
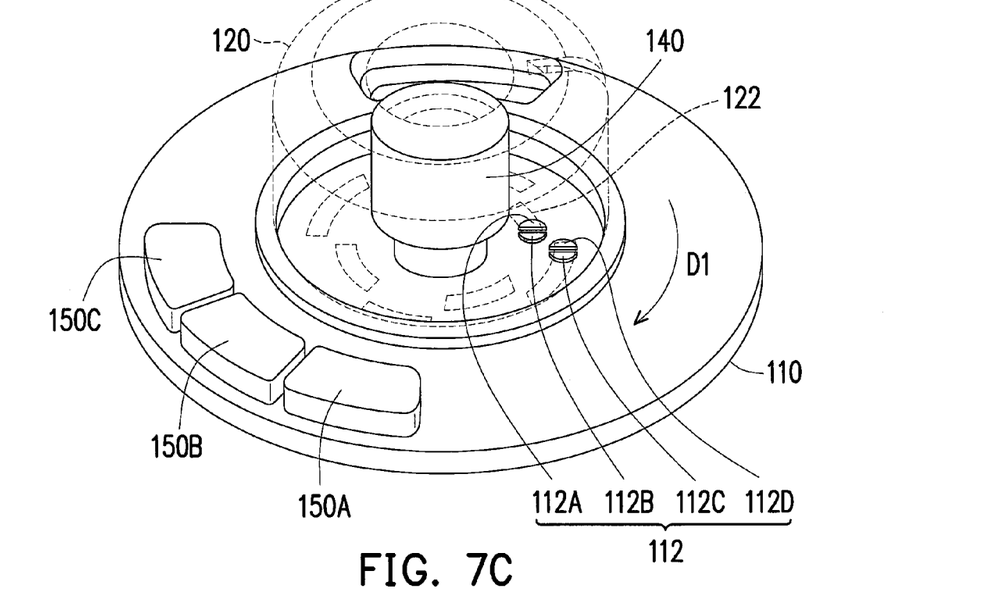
Figure 7D:
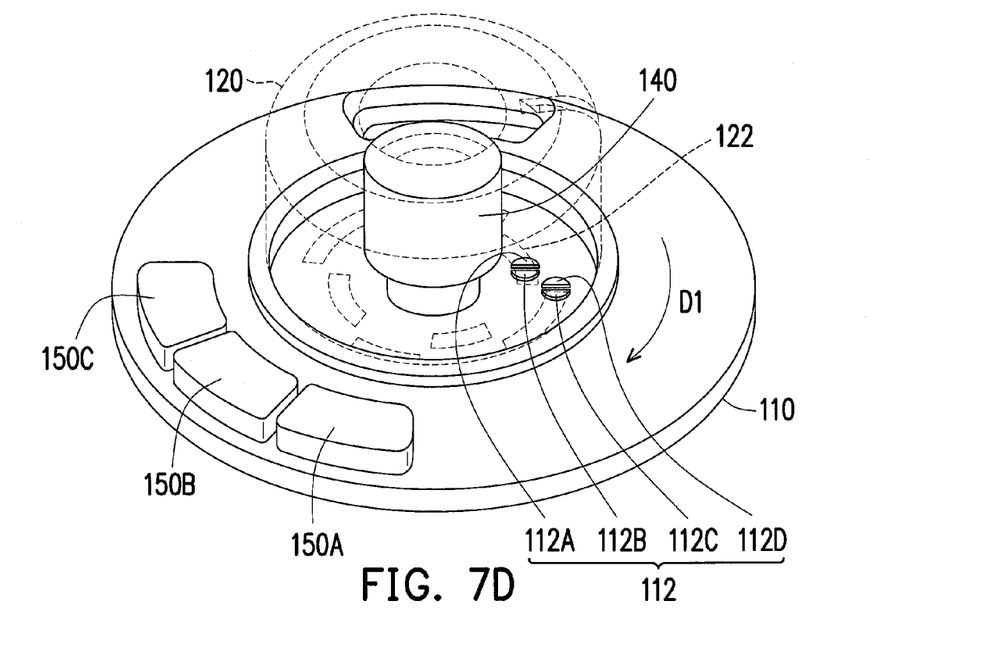
Figure 8:
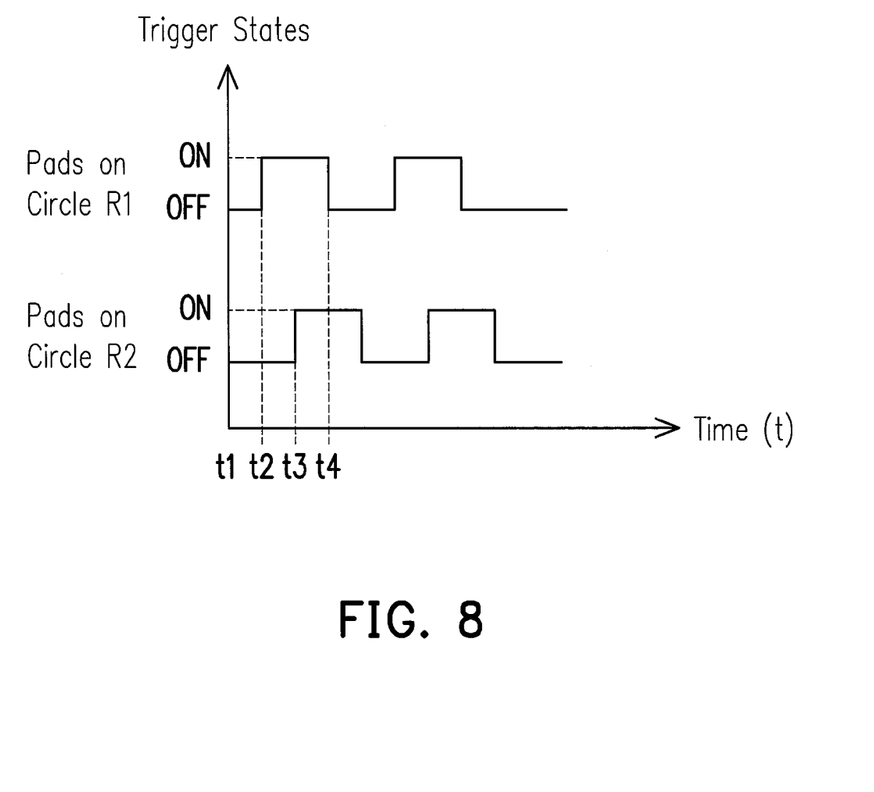
FIG. 8 is a phase diagram corresponding to FIGS. 7A-7D.

FIGS. 7A-7D illustrate the touch states of the second pads and the third pads at different time points. FIG. 8 is a phase diagram corresponding to FIGS. 7A-7D for illustrating the trigger states of the second pads and the third pads at different time points. FIG. 7A corresponds to a time point t1 in FIG. 8, FIG. 7B corresponds to a time point t2 in FIG. 8, FIG. 7C corresponds to a time point t3 in FIG. 8, and FIG. 7D corresponds to a time point t4 in FIG. 8. With reference to FIGS. 7A-7D and the corresponding FIG. 8, in the present embodiment, when the turning knob 120 rotates along a first rotating direction D1 (e.g., the clockwise direction in the drawings), the third pads 122 disposed on the circle R1 touch the corresponding second pads 112 before the third pads 122 disposed on the circle R2, and accordingly, the phase diagram depicted in FIG. 9 is formed. Similarly, when the turning knob 120 rotates along a second rotating direction D2 (e.g., the counterclockwise direction in the drawings), the third pads 122 disposed on the circle R1 touch the corresponding second pads 112 after the third pads 122 disposed on the circle R2. Accordingly, due to the second pads 112 and the third pads 122 being disposed on different circles R1 and R2 and generating a touch sequence, the rotating direction of the turning knob 120 can be determined.

Referring again to FIG. 5, it should be noted that, the second pads 112 of the present embodiment are disposed in pairs at the top side T1 of the base 110. Moreover, the second pads 112 correspond to the third pads, and the second pads 112 are disposed on different circles R1 and R2 relative to the rotating axis C1. For example, the second pads 112A and 112B have corresponding semicircular outlines and are disposed on the trajectory of the corresponding circle R2, and the second pads 112C and 112D have corresponding semicircular outlines and are disposed on the trajectory of the corresponding circle R1. Accordingly, when each of the third pads 122 rotates with the turning knob 120, the third pads 122 sequentially touches the second pads 112A and 112B of a same set, or the second pads 112C and 112D of a same set. However, under this condition, an electrically connected state is formed only when the third pads 122 bridge the same set of second pads 112A and 112B (or 112C and 112D). That is, the first pads 111 do not electrically connect to the third pads 122 when the third pads 122 only touch the second pads 112A or 112B (or the third pads 122 only touch the second pads 112C or 112D). In other words, the first pads 111E (or 111F) electrically connect to the third pads 122 when the third pads 122 simultaneously touch the second pads 112A and 112B (or 112C and 112D), and accordingly the turning knob control device 100 triggers the control state of the touch panel 210.

Figure 9A:
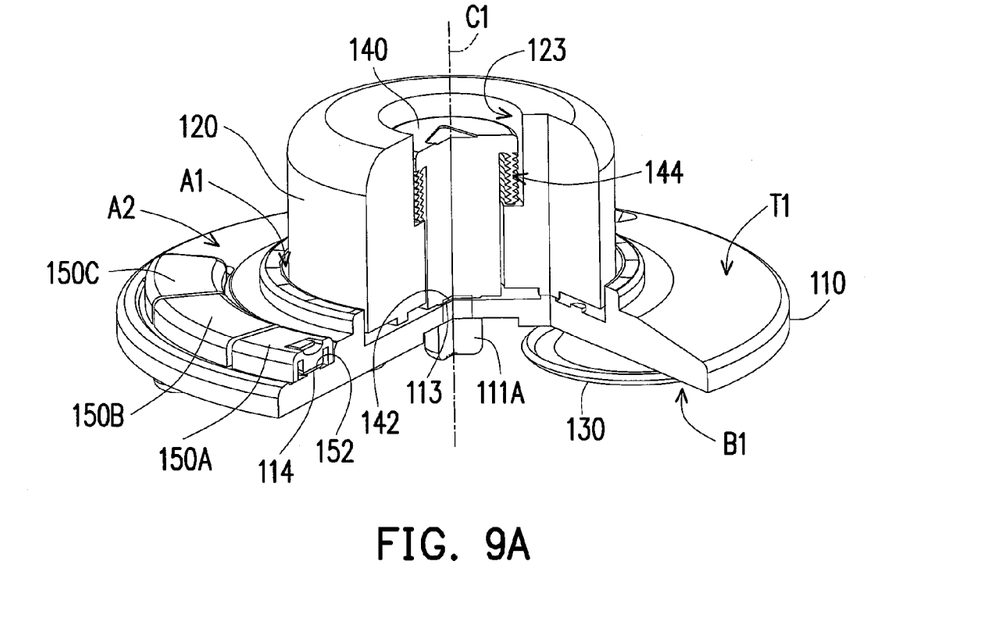
FIGS. 9A and 9B are respective partial cross-sectional views of the turning knob control device depicted in FIG. 3.
Figure 9B:
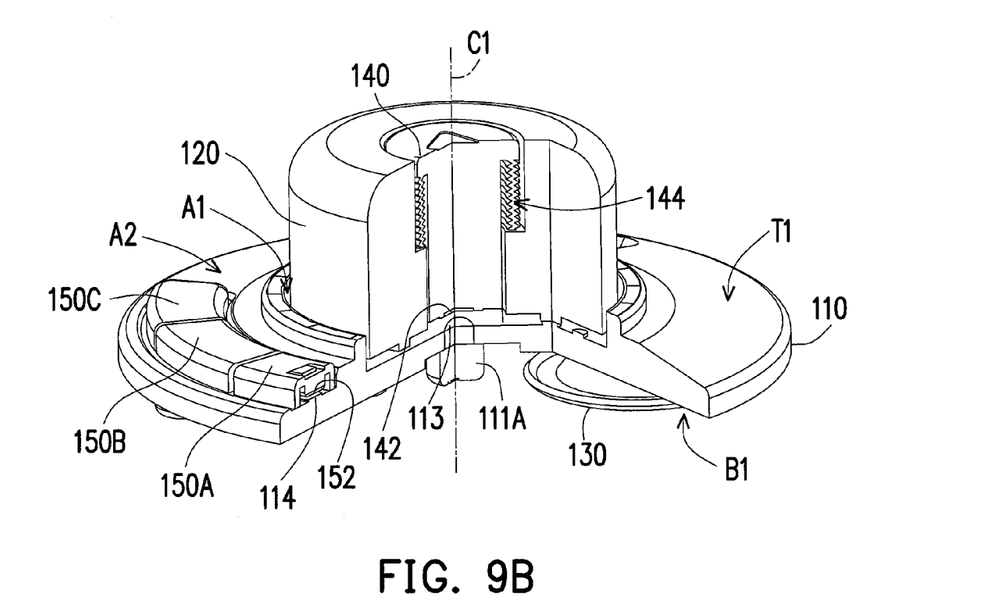

In addition, FIGS. 9A and 9B are respective partial cross-sectional views of the turning knob control device depicted in FIG. 3.

With reference to FIGS. 9A and 9B, in the present embodiment, the turning knob control device 100 further includes a first button 140 movably disposed at the top side T1 of the base 110. The turning knob 120 has a through hole 123, and the first button 140 is disposed in the through hole 123 and in a same axis as the turning knob 120 (e.g., axis-symmetric relative to the rotating axis C1).

Specifically, the base 110 has a center portion A1 and a disc portion A2 surrounding the center portion A1. The turning knob 120 and the first button 140 are disposed at the center portion A1 of the base 120. The first button 140 has a fourth pad 142 facing the top side T1, and the base 110 has a fifth pad 113 disposed at the top side T1 and corresponding to the fourth pad 142. The fifth pad 113 is electrically connected to the first pad 111A. As shown in FIG. 9A, the first button 140 is adapted to receive an external press so the fourth pad 142 touches the fifth pad 113, and the fifth pad 113 and the fourth pad 142 are electrically connected to the corresponding first pad 111A. In the present embodiment, the first button 140 is a power button. When the user disposes the turning knob control device 100 on the touch panel 210, the user can press the first button 140 to turn on the electronic device 200, such that the touch panel 210 enters the turning knob control mode. The first button 140 has an elastic portion 144 having one end propped on the turning knob 120 (e.g., on the steps of the inner wall of the through hole 123 of the turning knob 120 shown in FIGS. 9A and 9B). As shown in FIG. 9B, when the first button 140 is pressed by an external force, the elastic portion 144 restores the first button 140 by an elastic force thereof.

Furthermore, the turning knob control device 100 further includes a plurality of second buttons 150A, 150B, and 150C disposed at the disc portion A2 of the base 110. One of the second buttons 150A is used as an example for description.

The second button 150A has a sixth pad 152, and the base 110 has a seventh pad 114 disposed at the disc portion A2 and corresponding to the sixth pad 152. Moreover, the seventh pad 114 is electrically connected to one of the first pads 111 (e.g., 111B). Similar to the afore-described first button 140, the second button 150A is adapted to receive an external press so the sixth pad 152 touches the seventh pad 114, and the sixth pad 152 and the seventh pad 114 are electrically connected to the corresponding first pad 111B. Accordingly, the user can press the second button 150A and achieve the effect of controlling the touch panel 210. Likewise, when the second button 150B is pressed by an external force, the second button 150B can be electrically connected to the corresponding first pad 111C. Moreover, when the second button 150C is pressed by an external force, the second button 150C can be electrically connected to the corresponding first pad 111D.

For example, in the present embodiment, the three second buttons 150A, 150B, and 150C disposed on the disc portion A2 respectively represent different response properties of the electronic device 200 (e.g., volume, brightness level of the touch panel 210, or other control functions). When the turning knob control device 100 is disposed on the touch panel 210, and the control mode of the touch panel 210 is triggered, the user can select the response properties to adjust by respectively pressing the second buttons 150A, 150B, and 150C.

Referring again to FIGS. 2, 3, and 5, in the present embodiment, the base 110 also has a window 115 disposed at the disc portion A2 of the base 110. The window 115 partially exposes the touch panel 210 when the base 110 is disposed on the touch panel 210. When the user disposes the turning knob control device 100 on the touch panel 210 and turns on the corresponding control mode, the touch panel 210 displays the corresponding response property on the window 115, such that the user can identify a current state. As shown in FIG. 2, the user can determine in the window 115 that the response property currently controlled by the turning knob control device 100 is the volume of the electronic device 200, and the volume level is 5.

Figure 10:
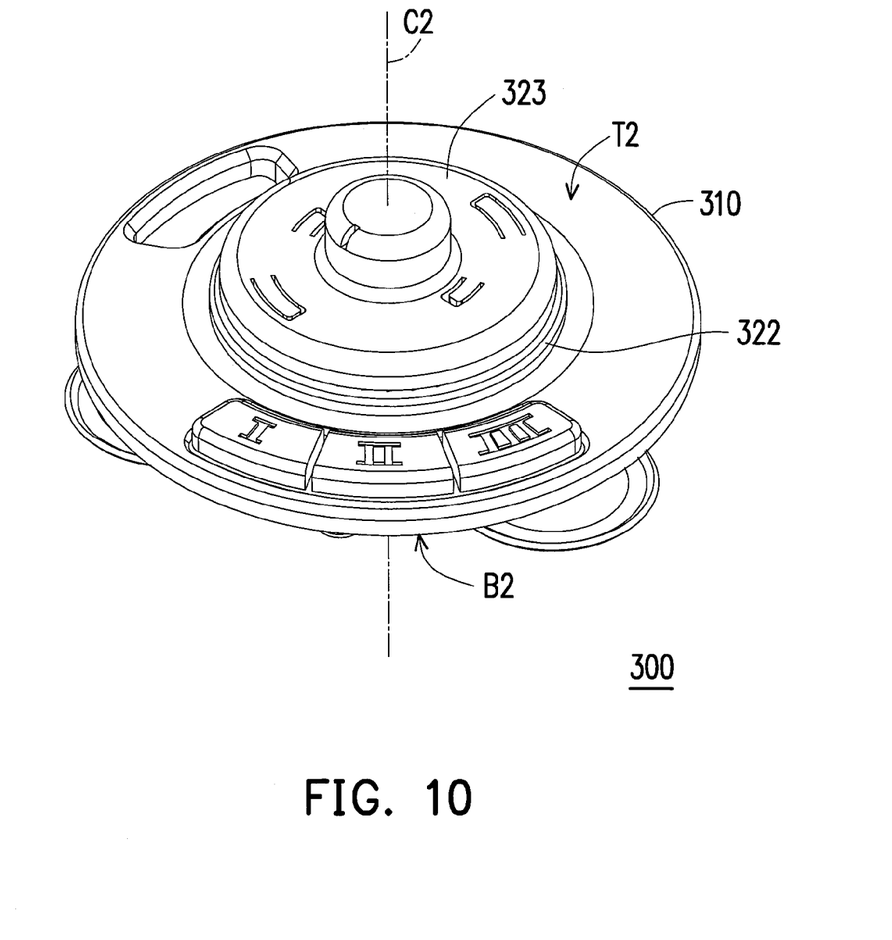
FIG. 10 is a schematic view of a turning knob control device according to another embodiment of the disclosure.
Figure 11A:
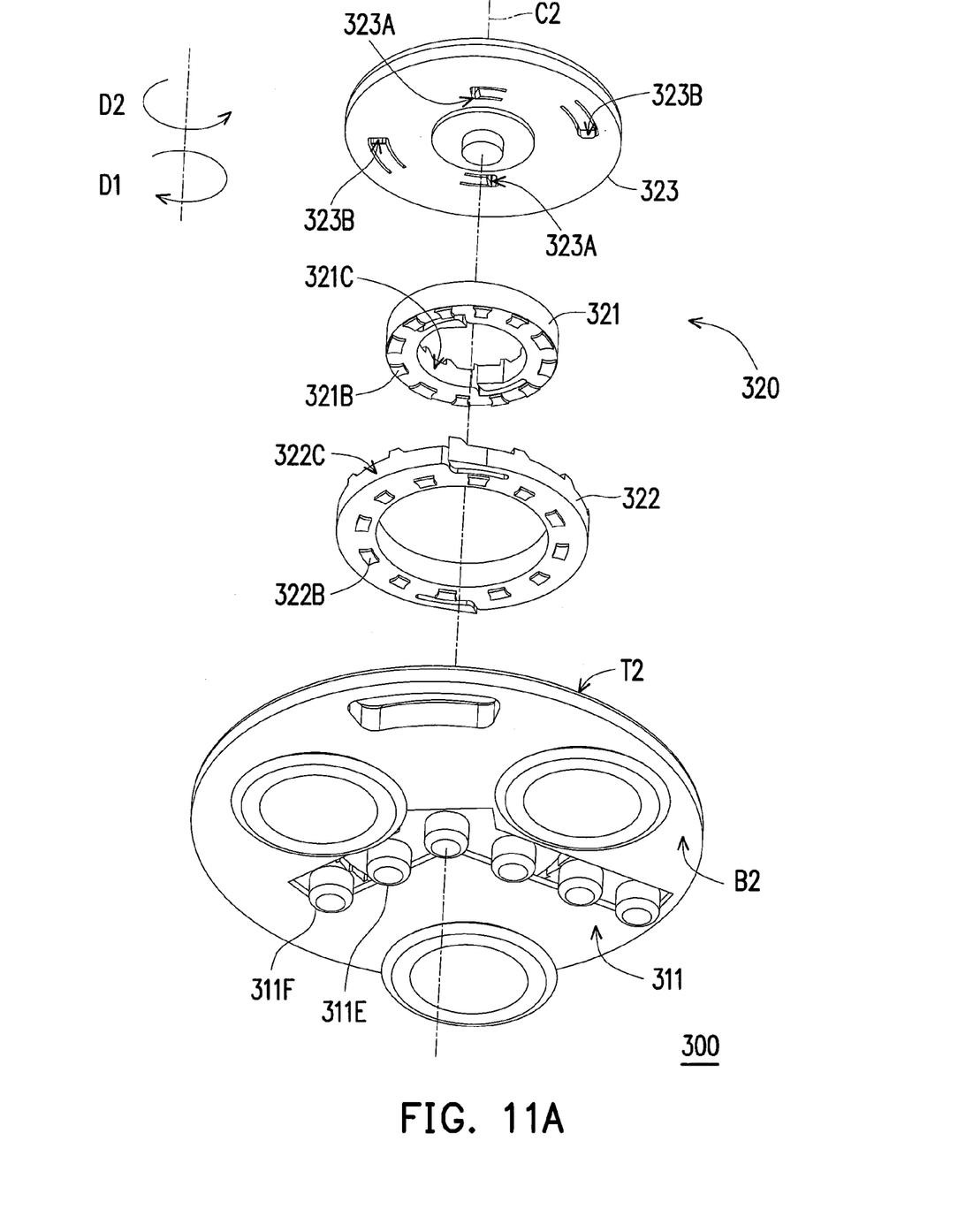
FIGS. 11A and 11B are exploded views respectively showing the turning knob control device of FIG. 10 under different viewing angles.
Figure 11B:
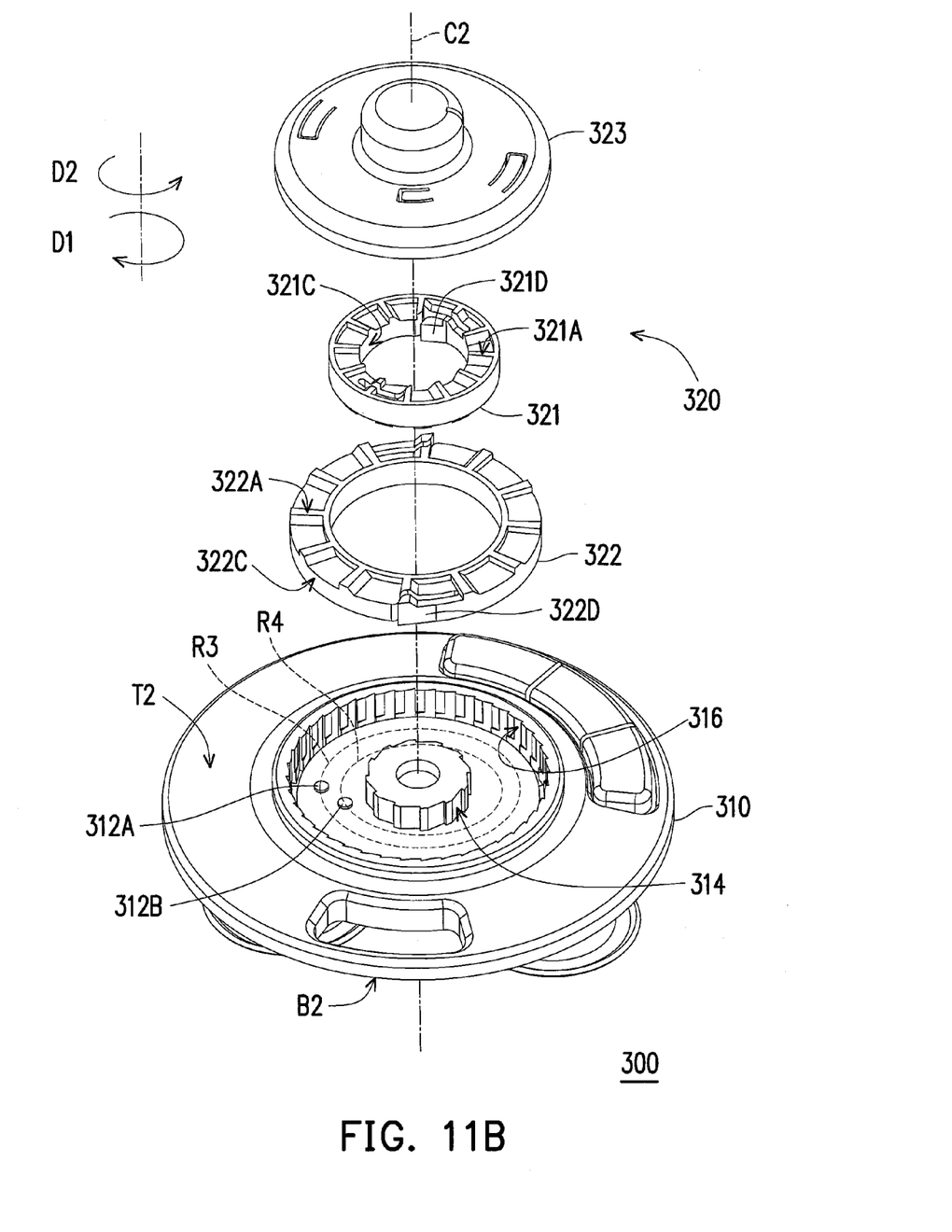

FIG. 10 is a schematic view of a turning knob control device 300 according to another embodiment of the disclosure. FIGS. 11A and 11B are exploded views respectively showing the turning knob control device 300 of FIG. 10 under different viewing angles. With reference to FIGS. 10, 11A, and 11B, in the present embodiment, the turning knob control device 300 is structurally similar to the afore-described embodiments. A difference in the turning knob control device 300 is that, a turning knob 320 includes a first rotating element 321, a second rotating element 322, and a third rotating element 323 disposed in a same axis relative to a rotating axis C2. The first rotating element 321 and the second rotating element 322 are assembled to a top side T2 of a base 310 on a same plane. The second rotating element 322 surrounds the first rotating element 321, and the two rotating elements 321 and 322 are independent from each other. The third rotating element 323 is disposed on the first rotating element 321 and the second rotating element 322. Moreover, the first rotating element 321 and the second rotating element 322 respectively have the third pads 321B and 322B. The third pads 321B and 322B respectively correspond to the second pads 312A and 312B on different concentric circles R3 and R4. In addition, the second pads 312A and 312B are respectively electrically connected to the first pads 311 (e.g., 311E and 311F) disposed at a bottom side B2 of the base 310. Since the corresponding relationships have been described earlier, further elaboration thereof is omitted. Based on the above, when the third pads 321B and 322B respectively rotates along with the first rotating element 321 and the second rotating element 322, the third pads 321B and 322B can be electrically connected to the corresponding second pads 312A and 312B.

Specifically, in the turning knob control device 300 of the present embodiment, the first rotating element 321 and the second rotating element 322 are respectively a ratchet wheel. The first rotating element 321 and the second rotating element 322 respectively has a plurality of first ratchets 321A and a plurality of second ratchets 322A disposed at a top portion. Moreover, the first ratchets 321A incline toward the second rotating direction D2 relative to the rotating axis C2, the second ratchets 322A incline toward the first rotating direction D1 relative to the rotating axis C2, and first rotating direction D1 is opposite to the second rotating direction D2. In addition, the third rotating element 323 has the first drive gears 323A and the second drive gears 323B disposed at a bottom portion and respectively corresponding to the first ratchets 321A and the second ratchets 322A. Two of each of the first drive gears 323A and the second drive gears 323B have been illustrated, although the disclosure is not limited thereto.

When the third rotating element 323 rotates along the first rotating direction D1, first drive gears 323A engage with at least one of the first ratchets 321A. At this moment, the second drive gears 323B and the second ratchets 322A have been in a released state (e.g., disengaged) from each other. Therefore, the third rotating element 323 only drives the first rotating element 321 to rotate along the first rotating direction D1, and the second drive gears 323B only slides past the second ratchets 322A. On the other hand, when the third rotating element 323 rotates along the second rotating direction D2, the first drive gears 323A slide past the first ratchets 321A, and the second drive gears 323B engage one of the second ratchets 322A, so that the third rotating element 323 only drives the second rotating element 322 to rotate. Accordingly, the present embodiment adopts a ratchet structure so that the turning knob 320 only rotates along a single direction. That is, when the user rotates the third rotating element 323 along the first rotating direction D1 or the second rotating direction D2, only the third pads 321B of the first rotating element 321 rotate, or only the third pads 322B of the second rotating element 322 rotate. Therefore, only one of the second pads 312A and 312B and the corresponding third pads 321B or 322B have a change in the contact state.

For example, when the user rotates the third rotating element 323 along the first rotating direction D1, only the third pads 321B of the first rotating element 321 are driven to rotate. Accordingly, the touch panel can detect a plurality of pulses through the first pads 311E and the second pads 323B during a rotation period of the third rotating element 323. At the same time, since the third pads 322B of the second rotating element 322 do not rotate, the touch panel cannot detect a pulse through the first pads 311F and the second pads 312A. In other words, the present embodiment enables single direction rotation using the structural characteristics, and this replaces determining the rotation direction of the turning knob 120 using the touch sequence of the third pads 122 and the second pads 112 as in the afore-described embodiments.

On the other hand, the base 310 also has an inner ratchet structure 314 and an outer ratchet structure 316 disposed at the top side T2. The inner ratchet structure 314 corresponds to an inner wall 321C of the first rotating element 321, and the ratchets of the inner ratchet structure 314 match the first ratchets 321A of the first rotating element 321. The outer ratchet structure 316 corresponds to an outer wall 322C of the second rotating element 322, and the ratchets of the outer ratchet structure 316 match the second ratchets 322A of the second rotating element 322. Moreover, a matching ratchet structure represents a consistent rotating direction can be followed. For example, the first rotating element 321 is only adapted to rotate along the first rotating direction D1. Therefore, the inner ratchet structure 314 follows the first rotating direction D1. That is, the inner ratchet structure 314 inclines along the first rotating direction D1. The second rotating element 322 is only adapted to rotate along the second rotating direction D2. Therefore, the outer ratchet structure 316 follows the second rotating direction D2. That is, the outer ratchet structure 316 inclines along the second rotating direction D2.

The first rotating element 321 and the second rotating element 322 are disposed between the inner ratchet structure 314 and the outer ratchet structure 316. The first rotating element 321 is coupled to the inner ratchet structure 314, and the second rotating element 322 is coupled to the outer ratchet structure 316. The first rotating element 321 and the second rotating element 322 are respectively a ring structure, and the first rotating element 321 also has a first fastening elastic arm 321D disposed at the inner wall 321C. The first fastening elastic arm 321D follows the direction of the inner ratchet structure 314 and slidably fastens between any two adjacent ratchets of the inner ratchet structure 314, and thereby providing a definite fastening sensation when the first rotating element 321 rotates. Similarly, the second rotating element 322 has a second fastening elastic arm 322D disposed at the outer wall 322C. The second fastening elastic arm 322D follows the direction of the outer ratchet structure 316. As the second rotating element 322 rotates, the second fastening elastic arm 322D slidably fastens between any two adjacent ratchets of the outer ratchet structure 316.

Figure 12:
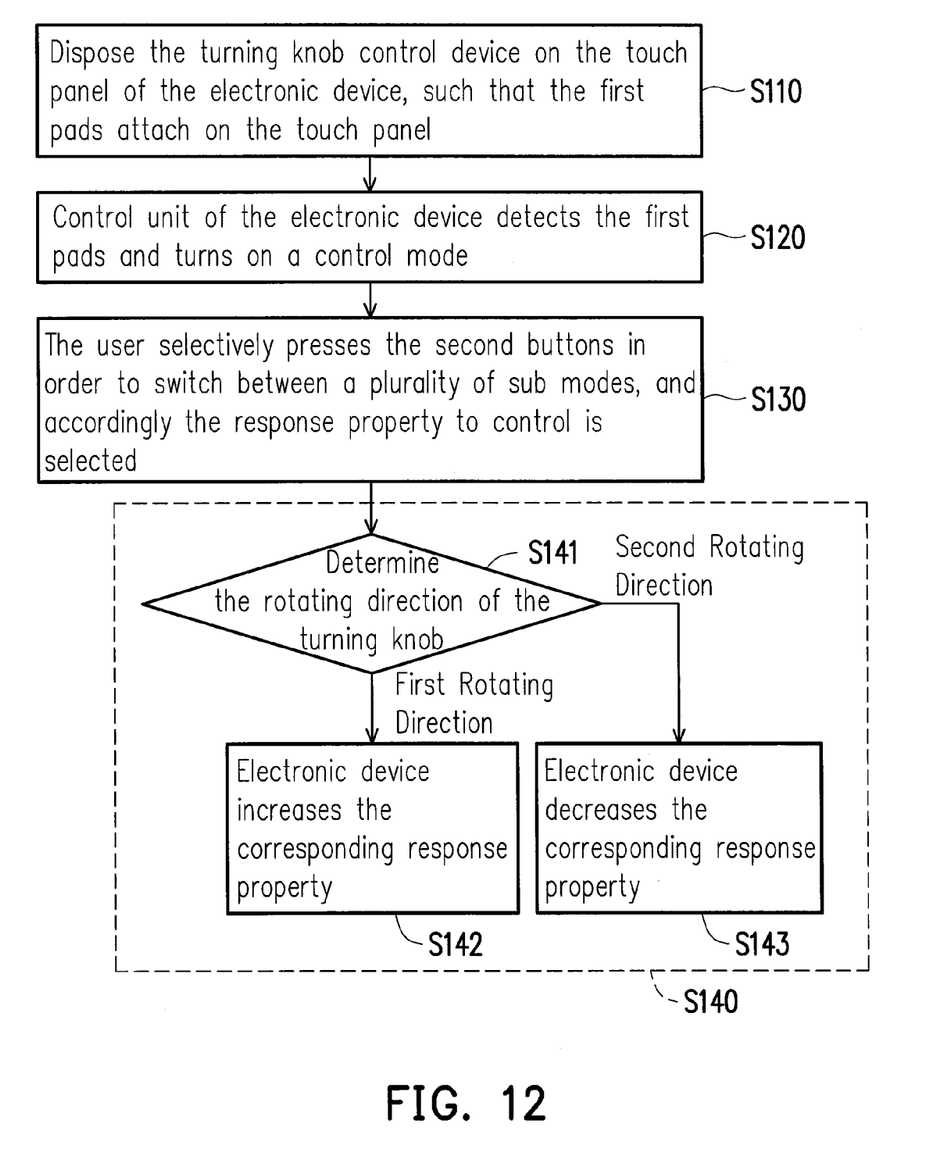
FIG. 12 is a control flow diagram of a turning knob control device corresponding to an electronic device according to an embodiment of the disclosure.

FIG. 12 is a control flow diagram of a turning knob control device corresponding to an electronic device according to an embodiment of the disclosure. The turning knob control device can be referenced by the afore-described embodiments. However, to further elucidate the following steps, the turning knob control device 100 is used as an example for description. With reference to FIG. 12, in a Step S110, the user disposes the turning knob control device 100 on the touch panel 210 of the electronic device 200, such that the first pads 111 are attached on the touch panel 210. In a Step S120, a control unit of the electronic device 200 detects the first pads 111 and turns on a control mode, and detects whether the turning knob 120 on the base 110 has rotated through the first pads 111. The control mode may be viewed as a corresponding program began and executed by the electronic device 200.

Moreover, the user can determine the current control mode through the window 115 of the turning knob control device 100.

In addition, as described in the embodiments above, the turning knob control device 100 further includes a first button 140. Accordingly, in another embodiment not illustrated herein, the aforementioned control mode may also be turned on after the user presses the first button 140.

Thereafter, in a Step S130, the user selectively presses the second buttons 150A, 150B, or 150C in order to switch between a plurality of sub modes of the control mode, and accordingly the response property to control is selected. As shown in FIG. 2, after the user presses one of the second buttons 150A, 150B, or 150C, the touch panel 210 displays this response property in the window 115 of the turning knob control device 100. For example, after the user presses the second button 150A, the electronic device 200 switches/selects the "volume adjust mode" among the sub modes, and the touch panel 210 displays the response property related to volume adjustment in the window 115 of the turning knob control device 100.

When the turning knob 120 rotates relative to the base 110, the turning knob 120 controls a response property of the touch panel 210 under the control mode (Step S140). In the present embodiment, Step S140 includes the Steps S141-S143, for instance. When the turning knob 120 rotates relative to the base 110, the user can control a response property of the touch panel 210 under the control mode. In a Step S141, the control unit of the electronic device 200 first determines a rotating direction of the turning knob 120, and thereafter the electronic device 200 presents the corresponding response property. At the same time, the control unit of the electronic device 200 informs the user of the current state of the electronic device 200 through the window 115. For example, when the Step S141 determines the rotating direction of the turning knob 120 is the first rotating direction (e.g., clockwise direction), the control unit of the electronic device 200 performs a Step S142 to increase the corresponding response property (e.g., turn up the volume). When the Step S141 determines the rotating direction of the turning knob 120 is the second rotating direction (e.g., counterclockwise direction), the control unit of the electronic device 200 performs a Step S143 to decrease the corresponding response property (e.g., turn down the volume).

According to the embodiments above, the rotating direction of the turning knob can be determined by the touch sequence of the pads of the turning knob control device 100, or by the ratchet wheel structure of the turning knob control device 300. It should be appreciated that, the turning knob control device 100 can be removed from the touch panel 210 when the user no longer needs to use the turning knob control device 100. When the touch panel 210 of the electronic device 200 cannot detect all of the first pads 111 of the turning knob control device 100, the control unit of the electronic device 200 correspondingly terminates the control mode.

In view of the foregoing, according to embodiments of the disclosure, due to the complementary arrangements of the pads in the turning knob control device, the user can dispose the control device on the touch panel of the electronic device freely, thereby allowing the user to directly adjust the state of the electronic device with the rotation of the turning knob. Therefore, the user can use a physical object instead of the hand directly contacting the touch panel, such that the user can experience a preferable control sensation due to the physical object.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:

1. A turning knob control device, disposed on a touch panel removably to control the touch panel, the turning knob control device comprising:
    a base having a bottom side, a top side, a plurality of first pads, and at least two second pads, wherein the first pads are disposed at the bottom side, the at least two second pads are disposed at the top side, and the at least two second pads are electrically connected to corresponding parts of the first pads, the base is assembled to the touch panel with the bottom side, such that the first pads touch the touch panel; and
    a turning knob disposed on the top side of the base rotating about a rotating axis, the turning knob having a plurality of third pads facing the base and surrounding the rotating axis, when the turning knob rotates along a direction relative to the base, the third pads are electrically connected to the corresponding at least one of the second pads sequentially.

2. The turning knob control device of claim 1, wherein the third pads are arranged as at least two concentric circles relative to the rotating axis, an orthographic projection of the at least two second pads on the turning knob being disposed on the at least two concentric circles.

3. The turning knob control device of claim 2, wherein the third pads located on different concentric circles are disposed alternating on the radial direction relative to the rotating axis of the turning knob.

4. The turning knob control device of claim 2, wherein the at least two second pads corresponding to different concentric circles are disposed alternating on the radial direction relative to the rotating axis of the turning knob.

5. The turning knob control device of claim 1, further comprising:
    a first button movably disposed at the top side of the base, the first button having a fourth pad facing the top side, the base having a fifth pad disposed at the top side and corresponding to the fourth pad, the fifth pad being electrically connected to one of the first pads, the first button being adapted to receive an external press so the fourth pad touches the fifth pad, and the fifth pad and the fourth pad are electrically connected to the corresponding one of the first pads.

6. The turning knob control device of claim 5, wherein the turning knob has a through hole, and the first button is disposed in the through hole, such that the turning knob and the first button are disposed in a same axis relative to the base.

7. The turning knob control device as claimed in claim 5, wherein the base has a center portion and a disc portion surrounding the center portion, and the first button and the turning knob are disposed at the center portion.

8. The turning knob control device of claim 7, further comprising:
    at least one second button disposed at the disc portion of the base, the at least one second button having a sixth pad, the base having at least one seventh pad disposed at the disc portion and corresponding to the sixth pad, the at least one seventh pad electrically connected to at least one of the first pads, the at least one second button being adapted to receive an external press so the sixth pad touches the seventh pad, and the sixth pad and the seventh pad are electrically connected to the corresponding one of the first pads.

9. The turning knob control device of claim 7, wherein the base has a window disposed at the disc portion, the window exposing a portion of the touch panel when the base is assembled to the touch panel.

10. The turning knob control device of claim 1, wherein the turning knob comprises a first rotating element, a second rotating element, and a third rotating element disposed in a same axis relative to the rotating axis, the first rotating element and the second rotating element being assembled to the top side on a same plane, the second rotating element surrounding the first rotating element and the first and second rotating elements being independent from each other, the third rotating element being disposed on the first rotating element and the second rotating element, and the third pads being respectively disposed on the first rotating element and the second rotating element.

11. The turning knob control device of claim 10, wherein the first rotating element and the second rotating element are respectively a ratchet wheel, the first rotating element and the second rotating element respectively having a plurality of first ratchets and a plurality of second ratchets disposed at a top portion, the first ratchets inclining toward a second rotating direction relative to the rotating axis, the second ratchets inclining toward a first rotating direction relative to the rotating axis, the first rotating direction being opposite to the second rotating direction, the third rotating element having at least one first drive gear and at least one second drive gear disposed at a bottom portion, when the third rotating element rotates along the first rotating direction, the first drive gear engages with one of the first ratchets, and the second drive gear slides past the second ratchets, such that the third rotating element only drives the first rotating element to rotate, when the third rotating element rotates along the second rotating direction, the first drive gear slides past the first ratchets, and the second drive gear engages with one of the second ratchets, such that the third rotating element only drives the second rotating element to rotate.

12. The turning knob control device of claim 11, the base having an inner ratchet structure and an outer ratchet structure disposed at the top side, the ratchets of the inner ratchet structure matching the first ratchets, the ratchets of the outer ratchet structure matching the second ratchets, the first rotating element and the second rotating element being disposed between the inner ratchet structure and the outer ratchet structure, wherein the first rotating element is coupled to the inner ratchet structure, and the second rotating element is coupled to the outer ratchet structure.

13. The turning knob control device of claim 12, wherein the first rotating element and the second rotating element are respectively a ring structure, and the first rotating element has a first fastening elastic arm disposed at an inner wall, the second rotating element has a second fastening elastic arm disposed at an outer wall, the first fastening elastic arm following the direction of the inner ratchet structure and slidably fastening between any two adjacent ratchets of the inner ratchet structure, and the second fastening elastic arm following the direction of the outer ratchet structure and slidably fastening between any two adjacent ratchets of the outer ratchet structure.

14. The turning knob control device of claim 1, wherein the base has four second pads each having semicircular outlines, and the four second pads are disposed in pairs on different concentric circles relative to the rotating axis.

15. The turning knob control device of claim 14, wherein in the two second pads forming a pair, one of the second pads is electrically connected to one of the first pads, and the other one of the second pads is electrically connected to the turning knob, and when the third pad bridges the pair of second pads, the turning knob, the pair of the second pads, and the third pad are electrically connected to the corresponding first pad.

16. The turning knob control device of claim 1, further comprising:
an attaching element disposed at the bottom side of the base to attach the base to the touch panel.

17. A controlling method of a touch panel, comprising:
disposing the turning knob control device of claim 1 on the touch panel so the first pads are attached on the touch panel;
turning on a control mode when a control unit of the touch panel detects the first pads; and
when the turning knob rotates relative to the base, the turning knob controlling a response property of the touch panel under the control mode.

18. The controlling method of the touch panel of claim 17, wherein the turning knob control device further comprises a first button movably disposed at the top side of the base, the first button having a fourth pad facing the top side, the base having a fifth pad disposed at the top side and corresponding to the fourth pad, the fifth pad being electrically connected to one of the first pads, the controlling method of the touch panel further comprising:
pressing the first button so the fourth pad touches the fifth pad, the fifth pad and the fourth pad are electrically connected to the corresponding one of the first pads, and the control mode is turned on.

19. The controlling method of the touch panel of claim 17, wherein the third pads are arranged as at least two concentric circles relative to the rotating axis, an orthographic projection of the at least two second pads on the turning knob being disposed on the at least two concentric circles, the controlling method of the touch panel further comprising:
when the turning knob rotates relative to the base, having a time difference between the third pads disposed on a first concentric circle touching the corresponding second pad, and the third pads disposed on a second concentric circle touching the corresponding second pad.

20. The controlling method of the touch panel of claim 19, wherein when the turning knob rotates along a first rotating direction relative to the base, the third pads disposed on the first concentric circle touch the corresponding second pad before the third pads disposed on the second concentric circle, and when the turning knob rotates along a second rotating direction relative to the base, the third pads disposed on the first concentric circle touch the corresponding second pad after the third pads disposed on the second concentric circle, and the first rotating direction is opposite to the second rotating direction.

21. The controlling method of the touch panel of claim 17, wherein the turning knob control device further comprises at least one second button disposed at the base, the at least one second button having a sixth pad, the base having at least one seventh pad corresponding to the sixth pad, the at least one seventh pad electrically connected to at least one of the first pads, the controlling method of the touch panel further comprising:
pressing the second button to switch between a plurality of sub modes of the control mode.

22. The controlling method of the touch panel of claim 17, wherein the base has a window exposing a portion of the touch panel, the controlling method of the touch panel further comprising:
after the touch panel turns on the control mode, displaying the response property in the window.

* * * * *